United States Patent
Tico et al.

(10) Patent No.: US 11,151,702 B1
(45) Date of Patent: Oct. 19, 2021

(54) DEEP LEARNING-BASED IMAGE FUSION FOR NOISE REDUCTION AND HIGH DYNAMIC RANGE

(71) Applicant: Apple Inc., Cupertino, CA (US)

(72) Inventors: Marius Tico, Mountain View, CA (US); Tiffany Jou Cheng, Palo Alto, CA (US); Jun Hu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 16/564,508

(22) Filed: Sep. 9, 2019

(51) Int. Cl.
*G06T 5/50* (2006.01)
*G06T 5/00* (2006.01)

(52) U.S. Cl.
CPC ............. *G06T 5/50* (2013.01); *G06T 5/002* (2013.01); *G06T 5/009* (2013.01); *G06T 2207/10016* (2013.01); *G06T 2207/20081* (2013.01); *G06T 2207/20084* (2013.01); *G06T 2207/20208* (2013.01); *G06T 2207/20221* (2013.01)

(58) Field of Classification Search
CPC .......... G06T 5/50; G06T 5/009; G06T 5/002; G06T 2207/20081; G06T 2207/10016; G06T 2207/20221; G06T 2207/20208; G06T 2207/20084
See application file for complete search history.

(56) References Cited

U.S. PATENT DOCUMENTS

| 2004/0028288 | A1* | 2/2004 | Edgar | G06T 5/002 382/275 |
| 2015/0348242 | A1* | 12/2015 | Molgaard | G06T 5/002 348/241 |
| 2019/0342485 | A1* | 11/2019 | Lee | H04N 5/2356 |
| 2020/0387718 | A1* | 12/2020 | Chan | G06K 9/6293 |

FOREIGN PATENT DOCUMENTS

WO WO-2020041882 A1 * 3/2020 ........... G06N 3/0454

* cited by examiner

*Primary Examiner* — Kim Y Vu
*Assistant Examiner* — Henock Berhanu Shebru
(74) *Attorney, Agent, or Firm* — Blank Rome LLP

(57) ABSTRACT

Electronic devices, methods, and program storage devices for leveraging machine learning to perform improved image fusion and/or noise reduction are disclosed. An incoming image stream may be obtained from an image capture device, wherein the incoming image stream comprises a variety of differently-exposed captures, e.g., EV0 images, EV− images, EV+ images, long exposure images, EV0/EV− image pairs, etc., which are received according to a particular pattern. When a capture request is received, two or more intermediate assets may be generated based on determined combinations of images from the incoming image stream, and the intermediate assets may then be fed into a neural network that has been trained to determine one or more sets of parameters to optimally fuse and/or noise reduce the intermediate assets. In some embodiments, the network may be trained to operate on levels of pyramidal decompositions of the intermediate assets independently, for increased efficiency and memory utilization.

20 Claims, 7 Drawing Sheets

DEEP LEARNING-BASED IMAGE FUSION FOR NOISE REDUCTION AND HIGH DYNAMIC RANGE

TECHNICAL FIELD

This disclosure relates generally to the field of digital image processing. More particularly, but not by way of limitation, it relates to techniques for leveraging machine learning to perform improved image fusion and noise reduction for images captured in a wide variety of capturing conditions.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being captured in a streaming fashion), a device condition measurement (such as an image captured with the least amount of device rotation), or any other image condition or set of conditions desired by a given implementation.

A "distance measure" may then be used to determine if the pixels in the candidate images are sufficiently similar to the corresponding pixel in the reference image to be fused. If the distance measure between a given candidate pixel in a candidate image and the corresponding pixel in the reference image is below a distance threshold, e.g., a noise-dependent distance threshold, the candidate pixel is deemed similar, and it may be used to contribute to the fused result for that pixel.

Often, there can be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image, but has different colors in the other candidate images will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image. Thus, in some embodiments, avoiding ghosting artifacts, e.g., by intelligently weighting the respective contributions of the various images contributing to the fusion at a given pixel location, may be desirable when fusing and/or noise reducing multiple images.

Despite these potential difficulties, in general, by fusing multiple images together, a better-quality resultant image may often be achieved than may be obtained from a single image capture. The multiple image captures used in a given fusion operation may comprise: multiple images captured with the same exposure (e.g., for the purposes of freezing motion), which will be referred to herein as Still Image Stabilization (SIS); multiple images captured with different exposures (e.g., for the purposes of highlight recovery, as in the case of High Dynamic Range (HDR) imaging); or a combination of multiple images captured with shorter and longer exposures, as may be captured when an image capture device's Optical Image Stabilization (OIS) system is engaged, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

In some prior art image fusion schemes, multiple image heuristics may need to be calculated, tuned, and/or optimized by design engineers (e.g., on a relatively small number of test images), in order to attempt to achieve a satisfactory fusion result across a wide variety of image capture situations. However, such calculations and optimizations are inherently limited by the small size of the test image sets from which they were derived. Further, the more complicated that such calculations and optimizations become, the more computationally-expensive such fusion techniques are to perform on a real-world image capture device. Thus, what is needed is an approach to leverage machine learning-techniques to improve the fusion and noise reduction of bracketed captures of arbitrary exposures, wherein the improved fusion and noise reduction techniques are optimized over much larger training sets of images and may be performed in a memory-efficient manner.

SUMMARY

Devices, methods, and non-transitory program storage devices are disclosed herein that leverage machine learning (ML) and other artificial intelligence (AI)-based techniques (e.g., deep neural networks) to improve image fusion and/or noise reduction, in order to generate low noise and high dynamic range images in a wide variety of capturing conditions in a memory-efficient and computationally-efficient manner. More particularly, an incoming image stream may be obtained from an image capture device, wherein the incoming image stream comprises a variety of differently-bracketed image captures, which are, e.g., received in a particular sequence and/or according to a particular pattern. When an image capture request is received, the method may then generate, in response to the capture request, two or more intermediate assets, wherein at least two of the intermediate assets comprise "image-based" intermediate assets, e.g., images generated using a determined one or more images form the incoming image stream. In some embodiments, one or more additional "non-image-based" intermediate assets may also be generated, which may comprise, e.g., noise maps, segmentation maps, or other data maps that contain data related to other image-based intermediate assets—and which may be used to aid in the fusion and/or noise reduction operations that leverage machine learning techniques.

According to some embodiments, a first intermediate asset may comprise a so-called "synthetic reference" (SR) image, which may comprise one or more constituent images from the incoming image stream, and which may be determined in order to attempt to freeze the motion of the captured scene (but which may contain an undesirable amount of noise), while a second intermediate asset may comprise a so-called "synthetic long" (SL) image, which may also comprise one or more constituent images from the incoming image stream, and which may be determined to attempt to reduce the amount of noise present in the captured scene (but which may contain an undesirable amount of motion blurring). The terms "synthetic" or "synthesized," in this context, are used to denote the fact that such assets are not typically directly captured by the image capture device, but instead may be generated or synthesized programmatically using a combination of actual image assets that are captured by the image capture device. In some such embodiments, the SR image may be comprised of images having an aggregate exposure time that is less than the aggregate exposure time of the images that are combined to form the SL image.

According to some embodiments, each of the image-based intermediate assets may be transformed using pyramidal decompositions. For example, Laplacian pyramidal decompositions comprising the use of a set of separable low-pass filters may be applied to each image-based intermediate asset, resulting in each image-based intermediate asset being represented by a pyramidal decomposition having a first plurality of levels, wherein each successively higher level of the pyramid represents residual higher frequency information of the image. Each of the image-based intermediate assets (along with whatever non-image intermediate assets are desired in a given implementation) may be fed into a neural network, e.g., a deep neural network that has been trained (e.g., on millions of test images) to determine optimal fusion weights and/or noise reduction parameters for respective corresponding pyramid levels of an arbitrary number of image-based intermediate assets having different exposure characteristics and/or expected noise levels.

Next, a fusion and/or noise reduction process may be performed on the generated intermediate assets, e.g., at each level of the intermediate assets' respective image pyramids, based on the corresponding output from the neural network, thereby generating an output image pyramid, also having the first plurality of levels, representing the image data after the fusion and/or noise reduction decisions made by the neural network based on the input data have been applied. Finally, an output image may be generated by collapsing the output image pyramid levels into a resultant image that has been fused and/or denoised according to the output of the neural network.

According to some embodiments, a proxy asset may be generated based upon the generated intermediate assets and then provided for display, e.g., via a user interface of an electronic device, prior to completing the generation of the output image using the aforementioned pyramidal decomposition process leveraging machine learning. The proxy asset may comprise a quick or coarse image fusion result, e.g., that does not benefit from the final output of the aforementioned fusion and/or noise reduction processing determined by the neural network—but which may instead serve as a temporary visual placeholder for a user of the electronic device, e.g., in the event that the pyramidal decomposition and machine learning processing takes additional time to complete. In some instances, once any additional pyramidal decomposition and machine learning processing has completed, any generated proxy asset may be replaced, e.g., in a user's media library or electronic device storage, with the final output image generated using the aforementioned processes leveraging machine learning techniques to drive fusion and/or noise reduction determinations.

As mentioned above, various non-transitory program storage device embodiments are disclosed herein. Such program storage devices are readable by one or more processors. Instructions may be stored on the program storage devices for causing the one or more processors to: obtain an incoming image stream from one or more image capture devices; receive an image capture request; generate, in response to the capture request, two or more intermediate assets, wherein: a first intermediate asset of the generated two or more intermediate assets comprises an image generated using a determined first one or more images from the incoming image stream, and a second intermediate asset of the generated two or more intermediate assets comprises an image generated using a determined second one or more images from the incoming image stream; generate a first pyramid decomposition, having a first plurality of levels, using the first intermediate asset; generate a second pyramid decomposition, having the first plurality of levels, using the second intermediate asset; feed the first and second intermediate assets into a neural network, wherein the neural network is configured to produce a set of filters corresponding to each level of the first and second pyramidal decompositions; generate an output image pyramid decomposition having the first plurality of levels, wherein each level of the output pyramid decomposition is determined using: the corresponding level of the first pyramid decomposition; the corresponding level of the second pyramid decomposition; and the corresponding set of filters produced by the neural network; and generate an output image using the output image pyramid decomposition.

Various methods of performing machine learning-enhanced image fusion and/or noise reduction are also disclosed herein, in accordance with the program storage device embodiments enumerated above. Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various program storage device embodiments enumerated above.

DETAILED DESCRIPTION

Figure 1A:
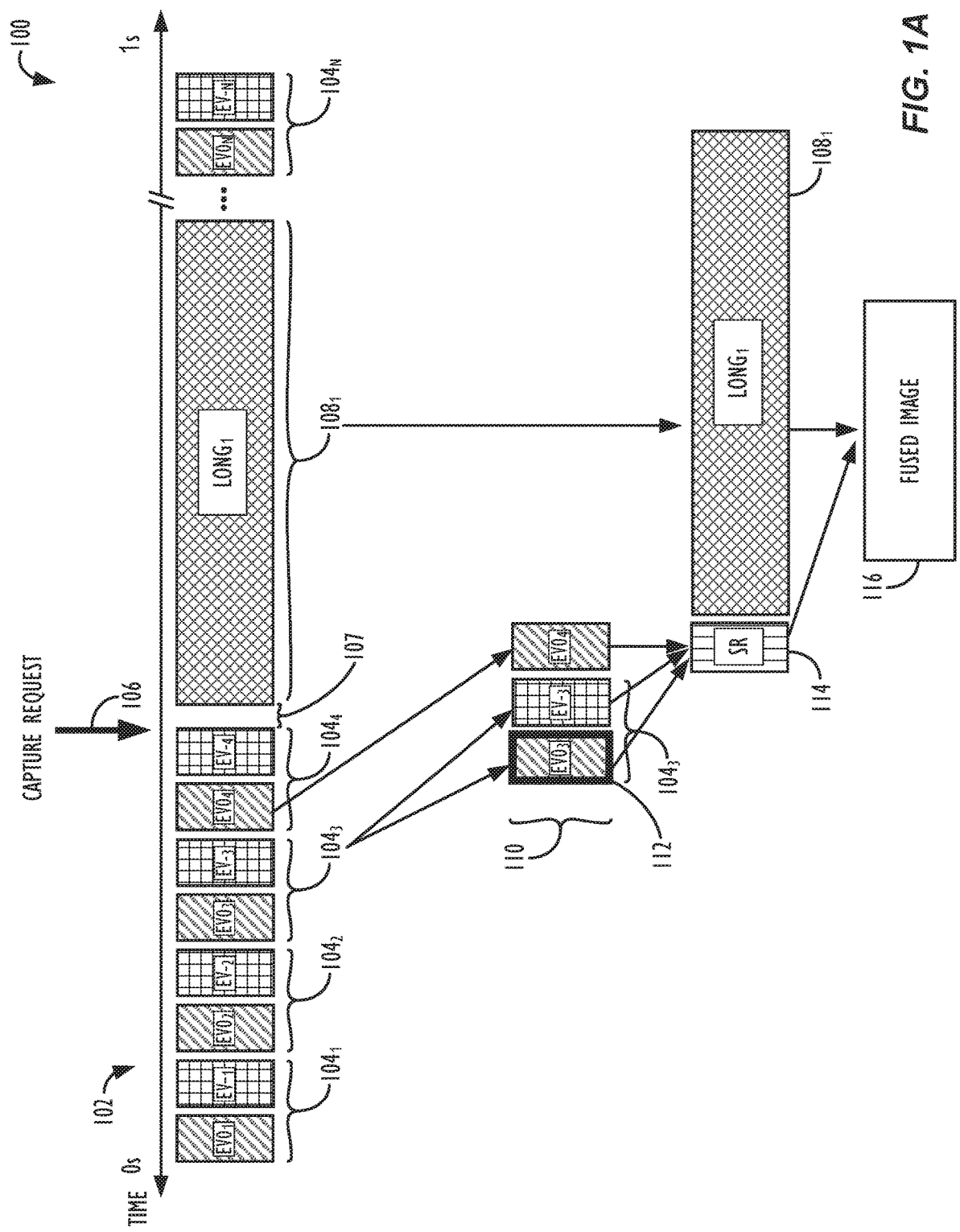
FIG. 1A illustrates an exemplary incoming image stream that may be used to generate a first synthetic intermediate asset to be used in a machine learning-enhanced image fusion and/or noise reduction method, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Discussion will now turn to the nomenclature that will be used herein to refer to the various differently-exposed images from an incoming image stream. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV-" image refers to an underexposed image that is captured at a lower stop (e.g., 0.5, 1, 2, or 3 stops) than would be used to capture an EV0 image. For example, an "EV-1" image refers to an underexposed image that is captured at one stop below the exposure of the EV0 image, and "EV-2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV-, EV0, EV+, and/or other longer exposure images. It is further noted that the image stream may also comprise a combination of arbitrary exposures, as desired by a given implementation or operating condition, e.g., EV+2, EV+4, EV-3 images, etc.

As mentioned above, in image fusion, one of the images to be fused is typically designated as the reference image for the fusion operation, to which the other candidate images involved in the fusion operation are registered. Reference images are often selected based on being temporally close in capture time to the moment that the user wishes to "freeze" in the captured image. In order to more effectively freeze the motion in the captured scene, reference images may have a relatively shorter exposure time (e.g., shorter than a long exposure image) and thus have undesirable amounts of noise. As such, reference images may benefit from being fused with one or more additional images, in order to improve the image's noise characteristics, while still sufficiently freezing the desired moment in the scene. Thus, according to some embodiments, enhanced reference images may be synthesized from multiple captured images that are fused together (the result of which will be referred to herein as a "synthetic reference image" or "SR" image). According to other embodiments, the synthetic reference image may also simply be the result of selecting a single bracketed capture (i.e., without fusion with one or more other bracketed captures). For example, in bright lighting capture scenarios, a single EV- image may serve as the synthetic reference image, while, in low lighting capture scenarios, a single EV0 image may serve as the synthetic reference image.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be synthesized from multiple captured images that are fused together (the result of which will be referred to herein as a "synthetic long image," "synthetic long exposure image" or "SL" image). According to other embodiments, the synthetic long image may also simply be the result of selecting a single bracketed capture (i.e., without fusion with one or more other bracketed captures). For example, a single EV+2 long exposure image may serve as the synthetic long image in a given embodiment.

Synthetic Reference images and Synthetic Long images may also be referred to herein as "intermediate assets," to reflect that they typically are not images captured directly by an image senor (e.g., other than the scenarios described above where a particular single bracketed image capture may be selected to serve as an intermediate asset). Instead, intermediate assets are typically synthesized or fused from two or more directly-captured images by the image sensor. Intermediate assets may be referred to as "intermediate," e.g., due to the fact that they may be generated (or selected) and used during an intermediate time period between the real-time capture of the images by the image sensors of the device and the generation of a final, fused output image. The intelligent use of intermediate assets may allow for fusion operations to benefit (to at least some extent) from the light information captured by a larger number of bracketed exposure captures, while still maintaining the processing and memory efficiency benefits of performing the actual fusion operation (e.g., leveraging potentially processing-intensive deep learning techniques) using only the smaller number of intermediate assets.

In instances where the image capture device is capable of performing OIS, the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types of long exposure images, e.g., depending on capture conditions. For example, in some embodiments, a synthetic long exposure image may be created when the image capture device does not or cannot perform OIS, while a single long exposure image may be captured when an OIS system is available and engaged at the image capture device. According to some embodiments, in order to recover a desired amount of shadow detail in the captured image, some degree of overexposure (e.g., EV+2) may intentionally be employed in bright scenes and scenes with medium brightness. Thus, in certain brighter ambient light level conditions, the long exposure image itself may also comprise an image that is overexposed one or more stops with respect to EV0 (e.g., EV+3, EV+2, EV+1, etc.). To keep brightness levels consistent across long exposure images, the gain may be decreased proportionally as the exposure time of the capture is increased, as, according to some embodiments, brightness may be defined as the product of gain and exposure time.

In some embodiments, long exposure images may comprise images captured with greater than a minimum threshold exposure time, e.g., 50 milliseconds (ms) and less than a maximum threshold exposure time, e.g., 250 ms, 500 ms, or even 1 second. In other embodiments, long exposure images may comprise images captured with a comparatively longer exposure time than a corresponding normal or "short" exposure image for the image capture device, e.g., an exposure time that is 4 to 30 times longer than a short exposure image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an OIS system during the capture operation.

It is to be noted that the noise level in a given image may be estimated based, at least in part, on the system's gain level (with larger gains leading to larger noise levels). Therefore, in order to have low noise, an image capture system may desire to use small gains. However, as discussed above, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have an OIS systems, the use of very long exposure times will likely result in motion blurred images, which is often undesirable. Thus, as may now be understood, the long exposure image's exposure time may not always be the maximum threshold exposure time allowed by the image capture device.

According to some embodiments, the incoming image stream may comprise a particular sequence and/or particular pattern of exposures. For example, according to some embodiments, the sequence of incoming images may comprise: EV0, EV−, EV0, EV−, and so forth. In other embodiments, the sequence of incoming images may comprise only EV0 images. In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence. The sequence of exposures may, e.g., continue in this fashion until a subsequent capture request is received, the camera(s) stop capturing images (e.g., when the user powers down the device or disables a camera application), and/or one when or more operating conditions may change. In still other embodiments, the image capture device may capture one or more additional EV0 images in response to the received capture request and then fuse the additional EV0 exposure images (along with, optionally, one or more additional EV0 images captured prior to the received capture request, if so desired) into a synthetic long exposure image, as discussed above, which synthetic long image may then be treated as a single image intermediate asset for the purposes of the machine learning-enhanced image fusion and/or noise reduction processes described herein. According to some embodiments, the images in the incoming image stream may be captured as part of a preview operation of a device, or otherwise be captured while the device's camera(s) are active, so that the camera may more quickly react to a user's capture request. Returning to the sequence of incoming images may ensure that the device's camera(s) are ready for the next image capture request.

Exemplary Incoming Image Stream

Referring now to FIG. 1A, an exemplary incoming image stream 100 that may be used to generate a first synthetic intermediate asset to be used in a machine learning-enhanced image fusion and/or noise reduction method is illustrated, according to one or more embodiments. Images from incoming image stream 100 may be captured along a timeline, e.g., exemplary image capture timeline 102, which runs from a starting point labeled 0 seconds, to a point labeled as 1 second. It is to be understood that this timeline is presented merely for illustrative purposes, and that a given incoming image stream could be captured for seconds, minutes, hours, days, etc., based on the capabilities and/or needs of a given implementation.

According to some embodiments, EV0 image frames in the incoming image stream may, by default, be captured according to a first frame rate, e.g., 15 frames per second (fps), 30 fps, 60 fps, etc. In some embodiments, this frame rate may remain constant and uninterrupted, unless (or until) an image capture request 106 is received at the image capture device. In other embodiments, the frame rate of capture of EV0 image frames may vary over time, based on, e.g., one or more device conditions, such as device operational mode, available processing resources, ambient lighting conditions, thermal conditions of the device, etc.

In other embodiments, one or more captured EV0 images may be paired with another image as part of a so-called "secondary frame pair" (SFP). The SFP, according to some embodiments, may comprise an image that is captured and read out from the image sensor consecutively, e.g., immediately following, the capture of the corresponding EV0 image. In some embodiments, the SFP may comprise an EV0 image and: an EV-1 image frame, an EV-2 image frame, or an EV-3 image frame, etc. EV− images will have a lower exposure time and thus be somewhat darker and have more noise than their EV0 counterpart images, but they may do a better job of freezing motion and/or representing detail in the darker regions of images.

In the example shown in FIG. 1A, SFPs 104 are captured sequentially by the image capture device (e.g., $104_1$, $104_2$, $104_3$, $104_4$, and so forth), with each SFP including two images with differing exposure values, e.g., an EV0 image and a corresponding EV− image. Note that the EV0 and EV− images illustrated in FIG. 1A use a subscript notation (e.g., $EV-_1$, $EV-_2$, $EV-_3$, $EV-_4$, and so forth). This subscript is simply meant to denote different instances of images being captured (and not different numbers of exposure stops). It is to be understood that, although illustrated as pairs of EV0 and EV− images in the example of FIG. 1A, any desired pair of exposure levels could be utilized for the images in an SFP, e.g., an EV0 image and an $EV-_2$ image, or an EV0 image and in $EV-_3$ image, etc. In other embodiments, the SFP may even comprise more than two images (e.g., three or four images), based on the capabilities of the image capture device.

In some embodiments, the relative exposure settings of the image capture device during the capture of the images comprising each SFP may be driven by the image capture device's AE mechanism. Thus, in some instances, the exposure settings used for each SFP may be determined independently of the other captured SFPs. In some instances, the AE mechanism may have a built in delay or lag in its reaction to changes in ambient lighting conditions, such that the AE settings of the camera do not change too rapidly, thereby causing undesirable flickering or brightness changes. Thus, the exposure settings for a given captured image (e.g., EV0 image, EV− image, and/or EV+ image) may be based on the camera's current AE settings. Due to the consecutive nature of the readouts of the images in an SFP, it is likely that each image in the SFP will be driven by the same AE settings (i.e., will be captured relative to the same calculated EV0 settings for the current lighting conditions). However, if the delay between captured images in an SFP is long enough and/or if the camera's AE mechanism reacts to ambient lighting changes quickly enough, in some instances, it may be possible for the images in a given SFP to be driven by different AE settings (i.e., the first image in the SFP may be captured relative to a first calculated EV0 setting, and the second image in the SFP may be captured relative to a second calculated EV0 setting). Of course, outside of the context of SFPs, it may also be possible for consecutive captured images, e.g., from an incoming image stream, to be captured relative to different calculated EV0 settings, again based, e.g., on changing ambient lighting conditions and the rate at which the camera's AE mechanism updates its calculated EV0 settings.

According to some embodiments, the capture frame rate of the incoming image stream may change based on the ambient light levels (e.g., capturing at 30 frames-per-second, or fps, in bright light conditions and at 15 fps in low light conditions). In one example, assuming that the image sensor is streaming captured images at a rate of 30 fps, the consecutive SFP image pairs (e.g., EV0, EV−) are also captured at 30 fps. The time interval between any two such SFP captures would be $\frac{1}{30}$th of a second, and such interval may be split between the capturing of the two images in the SFP, e.g., the EV0 and EV− images. According to some embodiments, the first part of the interval may be used to capture the EV0 image of the pair, and last part of the interval may be used to capture the EV− image of the pair. Of course, in this 30 fps example, the sum of the exposure times of the EV0 and EV− images in a given pair cannot exceed $\frac{1}{30}$th of a second. In still other embodiments, the capture of the EV− image from each SFP may be disabled based on ambient light level. For example, below a threshold scene lux level, the capture of the EV− image from each SFP may simply be disabled, since any information captured from such an exposure may be too noisy to be useful in a subsequent fusion operation.

Moving forward along timeline 102 to the capture request 106, according to some embodiments, a long exposure image $108_1$ may be captured by the image capture device in response to the receipt of the capture request 106. According to some embodiments, an additional delay 107 may be built in to the image capture stream following the receipt of an capture request 106, e.g., so that any shaking or vibrations caused by a user's touching or selection of a capture button on the image capture device (e.g., either a physical button or software-based user interface button or other graphical element) may be diminished before the initiation of the long exposure image capture, which, although more likely to produce a low-noise image, is potentially more prone to blurring, and thus lack of sharpness, due to the amount of time the shutter stays open during the capture of the long exposure image.

Based on the evaluation of one or more capture conditions, the image capture device may then select two or more images 110 for inclusion in an image fusion operation to generate a first intermediate asset, e.g., a synthetic reference (SR) image. According to some embodiments, the images selected to fuse together to form the synthetic reference may be chosen based, at least in part, on their sharpness, or any other desired criteria. In the example of FIG. 1A, the images: $EV0_3$, $EV_{-3}$, and $EV0_4$ have been selected for inclusion in the synthetic reference fusion operation, and, in particular, one of the images, $EV0_3$ (from secondary frame pair $104_3$) may be selected to serve as the reference image for the synthetic reference fusion operation. The resulting synthetic reference image is illustrated as intermediate asset SR 114 in FIG. 1A. It is to be understood that, in some embodiments, a selected EV0 reference image may be fused with one or more EV– images from: the same SFP, a previous SFP, the next SPF, or some other SFP, based on any desired criteria (e.g., proximity in capture time to the reference EV0 image for the synthetic reference image fusion operation).

The image capture device may then select one or more additional images, e.g., $LONG_1$ image $108_1$ (as illustrated in FIG. 1A) or additional generated intermediate assets, for inclusion in a final image fusion operation. In the example of FIG. 1A, the SR image 114 (generated from $EV0_3$, $EV_{-3}$, and EV04) and the $LONG_1$ image $108_1$ have been selected for inclusion in the final image fusion operation. According to some embodiments, one image may be selected to serve as the reference image for the final image fusion operation, e.g., the image (or synthetic image) having a capture time closest to the capture request 106, the image (or synthetic image) having the lowest aggregate exposure time, the sharpest image, the synthetic reference image 114, etc. As will be explained in further detail below with reference to FIGS. 3 and 4, machine learning techniques, e.g., deep neural networks, may be leveraged to determine a preferred or optimal way to fuse and/or denoise the images (or synthetic images) that are used in the final image fusion operation.

According to some embodiments, as an initial step, one or more of the SFPs may be identified as "candidate reference image pairs," i.e., an image pair from which the reference image for the synthetic reference image fusion operation may be taken. In some embodiments, the candidate reference image pairs may comprise a predetermined number of SFPs captured prior to (and/or after) a received capture request, e.g., image capture request 106. For example, in some embodiments, the candidate reference image pairs may comprise the four SFPs captured prior to the capture request. Next, a particular candidate reference image pair may be selected as the "selected reference image pair." For example, the selected reference image pair may be selected based, at least in part, on a comparison of the sharpness scores of the pair's respective EV0 image to sharpness scores of the respective EV0 images of the other candidate reference image pairs. In some instances, the selected reference image pair may simply be the SFP having the sharpest EV0 image. In other embodiments, the determination of the selected reference image pair may be based on one or more timing measures or image/device capture conditions. As mentioned above, in the example illustrated in FIG. 1A, secondary frame pair $104_3$ has been selected as the selected reference image pair for the SR image, due, e.g., to the fact that $EV0_3$ may be the sharpest EV0 image from among the EV0 images being considered for the fusion operation (or whatever image aspect or combination of aspects the reference image selection decision may be based on for a given implementation).

According to such embodiments, from the selected reference image pair (e.g., comprising one EV0 image and one EV– image), the process may select one image to serve as the reference image 112 for the creation of the SR image, e.g., either the EV0 image or the EV– image from the selected reference image pair. The determination of which image from the selected reference image pair to select to serve as the reference image for the SR image fusion operation may be based on a number of factors. For example, the determination may be based on various image aspects, such as: noise level, sharpness, and/or the presence (or prevalence) of ghosting artifacts. For example, in order to ensure lower noise, the EV0 image may be selected as the reference image, especially in lower ambient light level conditions. On the other hand, e.g., in dynamic scenes with moving objects and/or people, the EV– image may be preferred as the reference image because it ensures a shorter exposure time and hence less motion blurring than the corresponding EV0 image from the selected reference image pair. In the example illustrated in FIG. 1A, $EV0_3$ has been selected to serve as the reference image 112 for the fusion operation performed to generate the SR image intermediate asset 114 (as indicated by the thicker border line on $EV0_3$). Once a reference image is selected, each of the other selected images 110, e.g., including $EV_{-3}$ and EV04 in the example illustrated in FIG. 1A, may be registered with respect to the reference image 112 in order to form the synthetic reference image intermediate asset 114.

The final fusion operation of the selected images and/or intermediate assets from the incoming image stream 100 (e.g., SR image 114 and $LONG_1$ image $108_1$, as illustrated in FIG. 1A) will result in the final fused output image 116. As will be explained below with reference to FIG. 3, the decision of what weights to give the various images and/or image-based intermediate assets included in the fusion operation (as well as a set of weights to use to denoise the resulting fused image) may be based on one or more sets of output filters produced by a deep neural network. In some such embodiments, the determination of the fusion weights and denoising weights may be decoupled, i.e., determined independently, by the deep neural network. As also illustrated in the example of FIG. 1A, in some embodiments, after the capture of the long exposure image(s) following the capture request 106, the image capture stream may go back to capturing SFPs 104N, EV0 images, or whatever other pattern of images is desired by a given implementation, e.g., until the next capture request is received, thereby triggering the capture of another long exposure image (and/or the generation of one or more synthetic intermediate assets to be used in the final image fusion operation), or until the device's camera functionality is deactivated.

Figure 1B:
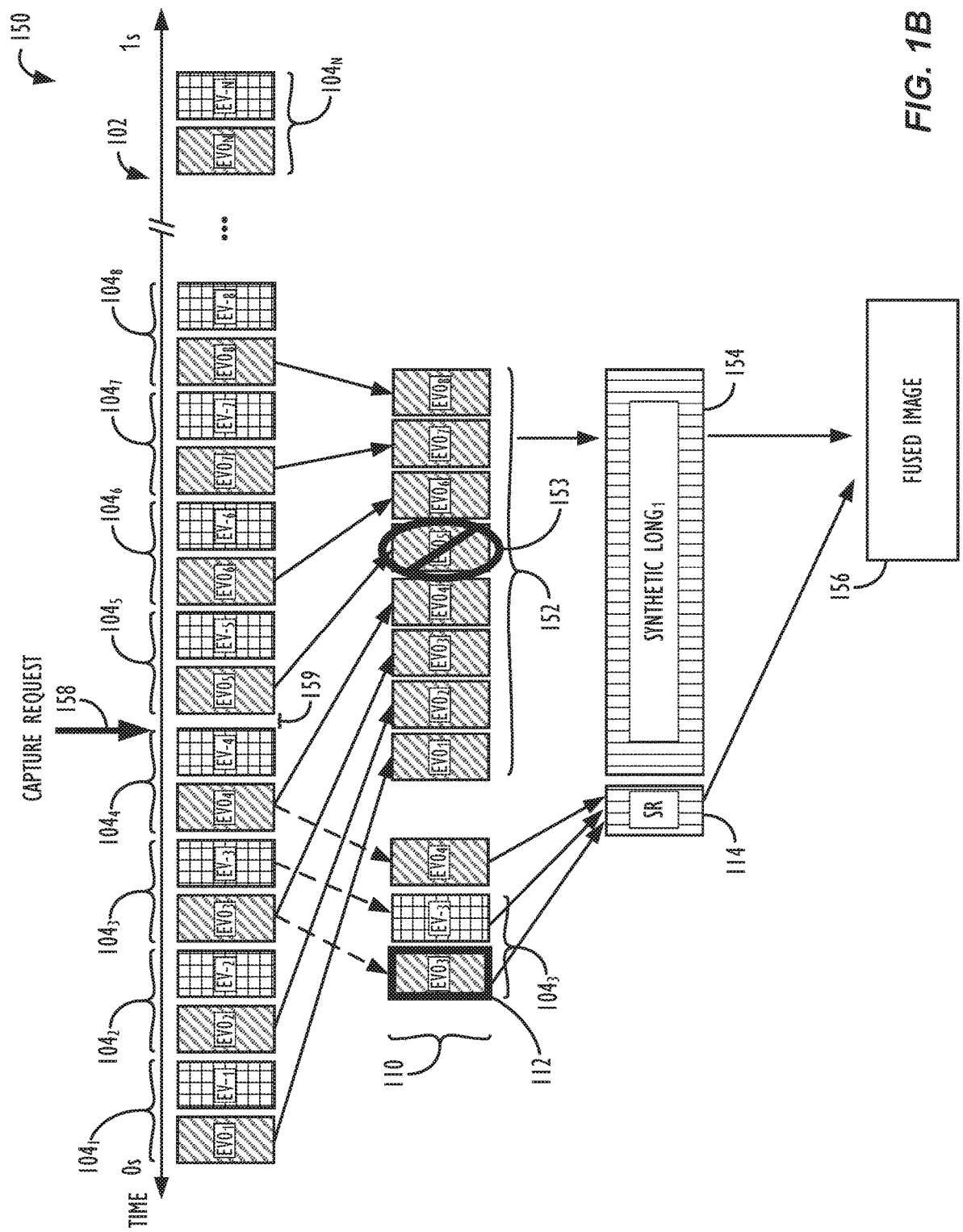
FIG. 1B illustrates another exemplary incoming image stream that may be used to generate first and second synthetic intermediate assets to be used in a machine learning-enhanced image fusion and/or noise reduction method, according to one or more embodiments.

Referring now to FIG. 1B, another exemplary incoming image stream 150 that may be used to generate first and second synthetic intermediate assets to be used in a machine learning-enhanced image fusion and/or noise reduction method is shown, according to one or more embodiments. In contrast with FIG. 1A, in the incoming image stream 150 shown in FIG. 1B, the image capture device does not capture a single long exposure image having a comparatively longer exposure time than the EV0 and EV– images in response to the capture request 158. Rather, the image capture device may take a series of two or more additional relatively shorter exposure EV0 and EV– images (e.g., as shown by secondary frame pairs $104_5$-$104_8$ in FIG. 1B). In the example of FIG. 1B, a set of images 152, e.g., four EV0 images captured after the capture request ($104_5$-$104_8$) and four EV0 images captured prior to the capture request ($104_1$-$104_4$), are selected and fused together (e.g., via an averaging algorithm) into a second generated intermediate asset, i.e., synthetic long exposure image ($SYNTHETIC\ LONG_1$ 154). In other embodiments, a different number of EV0 (or other relatively shorter exposure) images may be fused together to form the synthetic long exposure image, as is desired for a given implementation. For example, in a given embodiment, only the EV0 images captured prior to the capture request may be used, only the EV0 images captured after the capture request may be used, or a desired combination of EV0 images captured both prior to and after the capture request may be used. In still other embodiments, one or more EV− images captured prior to and/or after the capture request may also be used to form the synthetic long exposure image. For example, in one embodiment, a synthetic long exposure image may be formed by combining various selected EV0 and EV− images, e.g., via a weighted combination, where highlight regions are taken from the various EV− images, and the remaining parts of the scene are taken from the various EV0 images. In still other embodiments, an additional blurred frame elimination process may be executed on the set of images 152 selected for fusion into the synthetic long exposure image. For example, any EV0 frames that have greater than a threshold amount of blur (wherein blur amount may be estimated based on one or more criteria, e.g., information output by gyrometers or other motion sensors, autofocus score metadata, or other metadata) may be discarded from use in the creation of the synthetic long exposure intermediate asset image. In some embodiments, the permissible threshold amount of blur may be determined based on a comparison to the amount of blur in the selected reference image (i.e., $EV0_3$ 112 in the case of FIG. 1B). In the example illustrated in FIG. 1B, image $EV0_5$ 153 has been determined to have more than the maximum threshold amount of blur for the current capture operation, and thus has been discarded from use in the creation of the synthetic long exposure image 154. This greater relative amount blurring may be due, e.g., to the proximity in time of $EV0_5$'s capture to the receiving of capture request 158, which capture request can cause additional movement or shaking of the image capture device in immediately subsequently captured images, e.g., due to a user interacting with a display screen (e.g., touch input) or otherwise interacting with a user interface element (e.g., a button) of the device in order to indicate the capture request.

In some cases, a synthetic long exposure image may be desirable because a given implementation may not want to capture a long exposure image in response to a capture request, as it may disrupt a video stream that is concurrently being captured by the image capture device when the image capture request is received. In some instances, when a synthetic long exposure image is captured (e.g., as opposed to an actual long exposure image, as in FIG. 1A), the delay 159 time interval may be shortened (i.e., as compared to the case when a long exposure image is captured in response to the capture request)—or done away with altogether—as the multiple short exposure images 152 used to generate the synthetic long exposure image may be less susceptible to blurriness caused by any residual device motion from a user's interaction with the image capture device (e.g., touch input) to indicate the capture request than would a typical long exposure image. However, some scenes may be so dark that the use of a synthetic long exposure image would not be desirable, e.g., due to the increased noise that would result in the constituent short exposure images used to create the synthetic long exposure image.

Once the synthetic long exposure image 154 has been created, it may be fused with the other selected images and/or intermediate assets from the incoming image stream (e.g., synthetic reference image 114, which was formed from secondary frame pair $104_3$ comprising reference image $EV0_3$ 112 and $EV-_3$, in the example illustrated in FIG. 1B), in order to form the final fused image 156.

Figure 2:
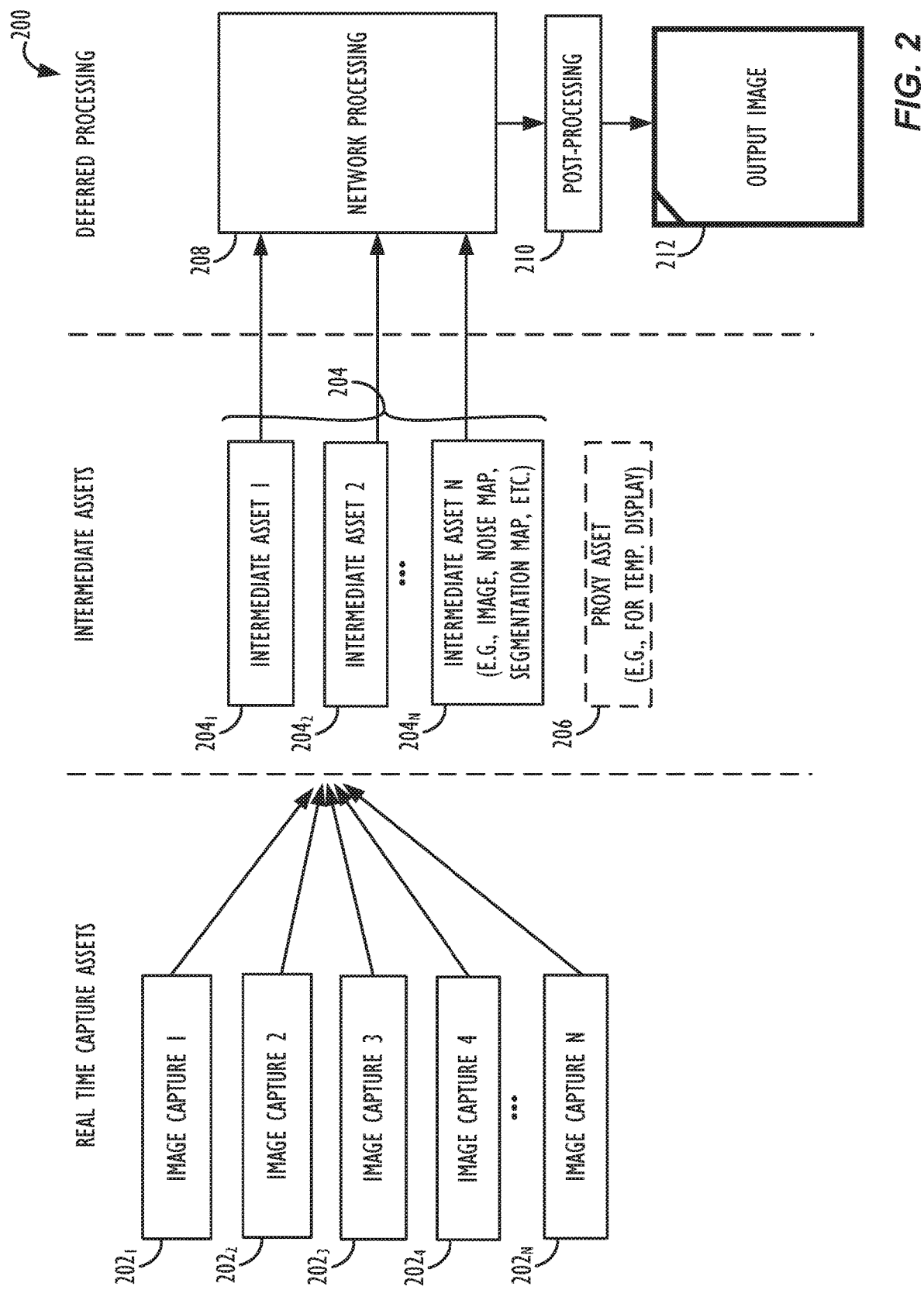
FIG. 2 illustrates an overview of a process for performing machine learning-enhanced image fusion and/or noise reduction, according to one or more embodiments.

Referring now to FIG. 2, an overview of a process 200 for performing machine learning-enhanced image fusion and/or noise reduction is illustrated, according to one or more embodiments. As described above with reference to FIGS. 1A and 1B, an image capture device may be placed into an image capture mode, whereupon, at an indicated time, e.g., upon a user of the image capture device pressing a shutter button, one or more images (e.g., image captures $202_1$-$202_N$ in FIG. 2) may be captured by one or more images sensors of the image capture device. These image captures 202 are referred to herein as "real time" capture assets, indicating that they are obtained at a rate that resembles the frame rate of the video images captured by the image sensor, e.g., 30 fps. The image captures 202 may comprise, e.g., one or more of the SFPs 104 and/or long exposure images 108, discussed above with reference to FIGS. 1A and 1B.

According to the embodiments described herein, one or more intermediate assets (e.g., intermediate assets $204_1$-$204_N$ in FIG. 2) may then be generated, e.g., based on a combination of two or more of the image captures 202. As described above with reference to FIGS. 1A and 1B, according to some embodiments, a first intermediate asset, e.g., Intermediate Asset 1 $204_1$ in FIG. 2, may comprise a synthetic reference image, and a second intermediate asset, e.g., Intermediate Asset 2 $204_2$ in FIG. 2, may comprise a synthetic long image. Each such first and second intermediate asset may be generated from a determined combination (e.g., a weighted combination) of two or more of the image captures 202. In some embodiments, the intermediate assets may comprise both "image-based" intermediate assets (such as the synthetic reference and synthetic long images described above), as well as "non-image-based" intermediate assets. For example, in some embodiments, non-image-based intermediate assets, such as noise maps representative of the amount of noise (or expected/estimated noise), segmentation maps (e.g., maps distinguishing semantic categories of pixels within an image, such as faces, hair, skin, sky, foliage, etc.), blur maps, etc., may also be generated based on one or more of the image-based intermediate assets that are generated. In some embodiments, in an effort to reduce the overall memory footprint of the fusion operation, the non-image-based intermediate asset (e.g., a noise map) may intentionally have a lower resolution than the incoming image stream images or the other image-based intermediate assets, and may simply be scaled up (or down) as needed, in order to be applied to or used with the images or other image-based intermediate assets.

In still other embodiments, in an effort to reduce the overall memory footprint of the fusion operation, rather than storing a noise value having a large bit depth (e.g., 32 bits, 64 bits, etc.) in each pixel entry of a noise map used as a non-image-based intermediate asset that is fed into the network, the noise map may instead simply store for each pixel entry in the noise map a value that is indicative of the amount of noise expected in the corresponding image at a given pixel location, e.g., a smaller bit depth (e.g., 4 bits) value reflecting the number of images from the incoming image stream contributing to the corresponding image-based intermediate asset at the respective pixel location of the intermediate asset. In other words, if 3 images were fused to produce the pixel value for a given pixel in a synthetic reference image, then the value '3' would be stored at the corresponding location in the noise map, whereas, if only a single image was used to produce the pixel value for a given pixel in a synthetic reference image, then the value '1' would be stored at the corresponding location in the noise map. In this way, the value stored in the noise map would serve as a more lightweight 'proxy' for the amount of expected noise at the corresponding location in the corresponding intermediate asset (e.g., synthetic reference image or synthetic long image). The network, then, could be trained to interpret these more lightweight noise proxy values in generating its noise reduction filter output values, which would save memory and processing time over being sent full (e.g., 32-bit or 64-bit) noise values for every pixel in the corresponding intermediate asset.

As will be explained in further detail below with reference to FIG. 3, both the image-based intermediate assets and the non-image-based intermediate assets may be fed into an appropriately trained neural network, in order to allow the network to intelligently determine an optimal way to fuse and/or noise reduce the various image-based intermediate assets into a final fused output image. In some embodiments, optimal, in this context, may refer to optimality with respect to a specific loss function that was used for training the neural network. Via the training, the neural network result will converge towards minimizing the specific loss function. In some instances, the neural network will be trained to generate filter values that may be used to produce a fusion result that simultaneously maintains, to the greatest extent possible, the sharpness from an intermediate asset having the shorter aggregate exposure time (e.g., the synthetic reference image) and the noise qualities of the intermediate asset having the longer aggregate exposure time (e.g., the synthetic long image).

According to some embodiments, the image capture device may also generate one or more so-called proxy assets, based on one or more of the generated intermediate assets. For example, a proxy asset may comprise a quickly or naively-fused version of the image-based intermediate assets. Such a proxy asset may be noisier and/or blurrier than the resultant final fused output image that is generated using the output of a trained neural network, but the proxy asset may serve as a temporary placeholder for a user, i.e., until such time as the proxy asset may be replaced or updated with the final fused output image. In some embodiments, the proxy asset may be provided for display, e.g., via a user interface of the electronic image capture device, prior to completing the generation of the final fused output image.

As mentioned above, according to embodiments disclosed herein, two or more intermediate assets 204 may be fed into a trained deep neural network 208 for further processing. In some such embodiments, the output of the network processing 208 may comprise a set of output filters for each layer of the network, wherein each layer of the network may correspond to a particular level of a pyramidal decomposition of each image-based intermediate asset. As will be described in further detail below with reference to FIG. 3, one or more non image-based intermediate assets may also be fed into the neural network (e.g., at each layer of the network), to further inform the network's generation of output filters at each layer of the network, which filters may be used, e.g., to specify how the corresponding levels of the pyramidal decompositions of each image-based intermediate asset should be fused and/or noise reduced.

Based on the aforementioned network output, a fused image may be generated from the image-based intermediate assets. Finally, at block 210, any desired tuning or post-processing may be applied to the fused image, to generate the final fused output image 212. Examples of the types of tuning and post-processing operations that may be performed on the fused image include: sharpening operations, determining a percentage of high-resolution details to be added back in to the fused image (e.g., based on an estimated amount of blurring, luma values, skin/face segmentation regions, etc.), tone mapping, and/or adjusting the amount of noise reduction applied to the fused image.

Figure 3:
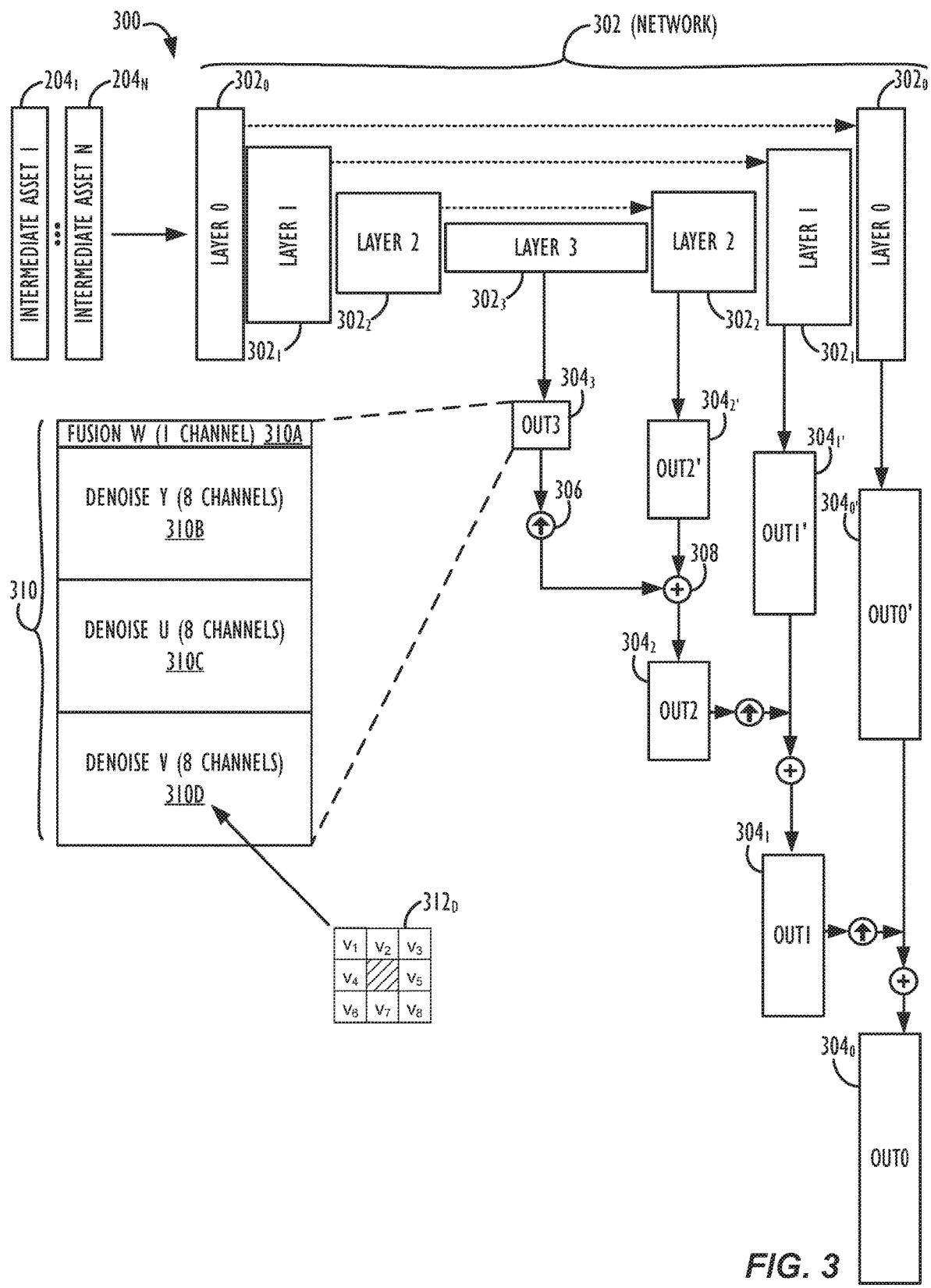
FIG. 3 is an example of a neural network architecture that may be used for performing machine learning-enhanced image fusion and/or noise reduction, according to one or more embodiments.

Referring now to FIG. 3, an example 300 of a neural network architecture that may be used for performing machine learning-enhanced image fusion and/or noise reduction is illustrated, according to one or more embodiments. As shown in FIG. 3, a neural network 302 may comprise a plurality of layers (e.g., layers $302_0$, $302_1$, $302_2$, $302_3$, as illustrated), wherein each layer comprises a plurality of channels. In some embodiments, the successive layers in the network (e.g., Layer 0, Layer 1, Layer 2, etc.) may become smaller in size (e.g., with a ¼ size reduction at each successive layer), but deeper in terms of channels (e.g., with a doubling of the number of channels in each successive layer). As may be understood, the exact size, number of layers, number of channels, etc. used for a network may be customized to the needs and processing abilities of a given implementation, and the network 302 shown in FIG. 3 is merely exemplary.

As mentioned above, the input to network 302 may comprise two or more intermediate assets 204. The intermediate assets 204 may comprise both image-based intermediate assets (e.g., a synthetic reference image and a synthetic long image) as well as non-image based intermediate assets (e.g., a noise map corresponding to each of the image-based intermediate assets). It is to be understood that these inputs to the network 302 are merely exemplary, and more (or fewer) inputs to the network may be used, based on the needs and processing abilities of a given implementation.

According to some embodiments, the network 302 may be designed according to a pyramid scheme. Such a design may comprise the network having multiple outputs (e.g., outputs $304_0$, $304_1$, $304_2$, $304_3$, as illustrated in FIG. 3). Each output may, e.g., correspond to a given layer of the network 302 and may be applied to a corresponding level of a pyramidal representation of an image-based input intermediate asset 204. For example, according to some network architectures disclosed herein, the network may have one output corresponding to each level of the pyramidal representation of the input intermediate assets, and the resolution of each network output 304 may have the resolution of the respective network layer. Thus, for the example shown in FIG. 3, output 3 ($304_3$) may have the smallest resolution, output 2 ($304_2$) may have the next largest resolution, and so forth. While preferred embodiments may utilize each of the outputs produced by the network in the production of the fused output image, in some embodiments, only a subset of the outputs produced by the network (and/or a subset of the layers of the network) may be used in the generate of the final fused image.

According to some pyramid scheme designs, Laplacian pyramids may be used to represent the image-based intermediate assets, meaning that each successively higher level of each image's pyramid represents only the residual (e.g., high frequency details) that are added over the preceding level. Laplacian pyramids are one form of multi-band decompositions. Any suitable multi-band decomposition technique could also be used by a given implementation (e.g., discrete wavelet transforms, etc.), so long as the neural network is designed to work with the output of the selected image decomposition.

As mentioned above, according to some embodiments, the neural network is designed to provide an output (e.g., a set of filters) for each level of the selected image decomposition. In this way, the neural network outputs may be used to improve each preceding level (e.g., frequency band-based level) of the image decomposition. Controlling the different frequency bands of the image decomposition independently is useful for improving final image quality. For instance, denoising may be performed differently at different frequency bands, which could be useful in preserving some high-resolution details, e.g., by denoising less in high frequency bands.

In the example of Laplacian pyramids, each level of the Laplacian pyramid contains only the difference between two adjacent low-pass images of the equivalent Gaussian pyramidal representation. (In the example of Laplacian pyramids, only the lowest resolution level of the pyramid represents an actual image, and the higher levels represent additional higher frequency details.) By using a multi-resolution image decomposition (i.e., rather than a single resolution)—the network may reach convergence faster and be more robust, e.g., ensuring better convergence towards a global optimum. In particular, the multi-resolution decomposition approach allows for lower frequency bands to "see" a lower resolution of the search space, thereby being less attracted to converge to insignificant local optima. Higher frequency bands, which will "see" a noisier search space, are then guided by the lower frequency bands results, such that they are driven to converge towards more meaningful optima—rather than insignificant local optima.

Moreover, by having each level of the pyramid represent only the residual information over the preceding level in the pyramid, the output filters of the corresponding neural network layers are able to be simply a modification of the filters from the preceding layer. This also allows the fusion operation to be more consistent, as it causes a single pixel to be filtered consistently across all levels. In other words, the filters generated by the neural network for different levels are not independent of one another. Higher resolution filters are calculated "on top" of lower resolution filters. Thus, the optimization performed at the lower frequency bands is used to guide the optimization of the higher frequency bands. As such, at an image level, the robustness in training is manifested via a lower probability of introducing artifacts that are not present in the input image during the network processing operations.

The output image may then be reproduced by successively collapsing the levels of the Laplacian pyramidal representation of the output fused image. For example, the filters 310 determined by output 3 $304_3$ of the network 302 (which will be described in further detail below) may be applied to the lowest resolution, i.e., lowest-level, pyramidal representations of the image-based input intermediate assets.

The application of the filters from output 3 $304_3$ to the lowest-level pyramidal representations of the image-based input intermediate assets will result in a low-resolution image that has been fused and/or noise reduced according to the determinations made by the network, as reflected in the values of filters 310. This fused and/or noise reduced low-resolution image may then be upscaled (306) to the resolution of the next network layer (e.g., upscaled by a factor of 2) and then combined (308) with the result of the application of the filters from output 2 to the next highest-level pyramidal representation of the image-based input intermediate assets ($304_{2'}$). The result of combining the fused and/or noise reduced low-resolution image from level 3 with the result of the application of the filters from $304_{2'}$ will become the output image of level 2 ($304_2$).

This process of upscaling and then combining the current output image with the output of the application of the filters from the next higher layer of the network to the next higher level of the pyramidal representations of the image-based input intermediate assets may then be repeated iteratively until the top level of the pyramidal representations (and, by design, the highest resolution layer of the network, e.g., Layer 0 $302_0$ in FIG. 3), are reached. At that point, the network-determined fusion and/or noise reduction parameters 310 for each layer will have been independently applied to each corresponding pyramidal level of the image-based input intermediate assets, and the resulting levels of the output image pyramidal representation may be collapsed and used to generate an output image, according to know pyramidal image decomposition techniques.

One benefit of applying the fusion-related filters at the lowest resolution level of the image-based intermediate assets first is that it is easier for the network to identify relatively larger moving objects with better quality and speed. For example, if the network didn't have access to information from the lower levels, some of the information may disappear by the time they reached the higher levels (e.g., in the case of small artifacts that may disappear from being noise-reduced or smoothed over at the lower levels). By dividing out the work of the different levels of the pyramidal decompositions to different network layers, the network is not asked to process all the details in the image at each level. In fact, by the time the highest level of the image-based intermediate assets are being processed by the network (e.g., to determine fusion and/or noise reduction parameters), only the highest frequency fine details in the image are left to filter (e.g., fuse and/or noise reduce)—all other image content will have already been filtered at the lower levels of the image pyramids.

As alluded to above, according to some embodiments, the output 304 of each network layer is not an image itself. Instead, it may just be a set of filters that are to be applied to the corresponding levels of the pyramidal representations of the image-based input intermediate assets. As one illustrative example, the output filters 310 for a given layer of the network may comprise 25 distinct channels (i.e., values) for each pixel location in the respective pyramidal level.

As illustrated in FIG. 3, the first channel in the set of filters produced by the network for a given pixel in a respective pyramidal level may comprise a fusion weight, w (310A). This fusion weight may specify, e.g., an alpha blending weight to be applied to the corresponding pixels of the image-based input intermediate assets. In the simple case of two image-based input intermediate assets, e.g., a synthetic reference image and a synthetic long image, the following equation may be used:

$$\text{Fused\_Result}_{(i,j)} = w * SL_{(i,j)} + (1-w) * SR_{(i,j)} \quad \text{(Eqn. 1)},$$

wherein (i,j) refers to a given pixel location in each of the synthetic long (SL), synthetic reference (SR), and resulting fused (Fused_Result) images at a given pyramid level, and w is the aforementioned fusion weight value, as determined by the network.

Thus, a weight value of 0 at a given pixel location may mean to pull that pixel's value for that level of the output image pyramid 100% from the synthetic reference image, while a weight value of 1 at the given pixel location may mean to pull that pixel's value for that level of the output image 100% from the synthetic long image. A value of 0.75, e.g., may specify to generate the pixel's value using a blend of 75% of the corresponding pixel's value from the synthetic long image and 25% of the corresponding pixel's value from the synthetic reference image.

As may be understood, the network may base its decisions on information pulled from one or more of the non-image-based input intermediate assets to the network, as well. For example, information regarding scene motion or expected ghosting artifacts at particular pixel locations within the image-based intermediate assets may inform the network as to which of the image-based intermediate assets to more heavily weight in the fusion operation at a given pixel location (e.g., more heavily-weighting the intermediate asset with less expected ghosting artifacts at the given pixel location). It is to be understood that, in more complex network architectures, e.g., those which blend between three or more image-based intermediate assets for the fusion operation, that more than a single output filter channel may be dedicated to fusion weights, and the example of a single fusion weight channel in filter set 310 of FIG. 3 is merely geared towards the example of blending between just two image-based intermediate assets, e.g., a SR image and an SL image.

Moving down the exploded view of filter set 310, the remaining 24 channels may comprise three sets of 8 noise reduction-related channels, e.g., one set of 8 channels for each image plane used to represent or encode the output image's information. For example, in the case of an image that is YUV-encoded, there could be 8 channels dedicated to the luminance component (Y) 310B, 8 channels dedicated to the U component 310C, and 8 channels dedicated to the V component 310D. Of course, other image encodings could be used as desired in a given implementation, with the output filters from the network being utilized accordingly (e.g., with an RGB encoding, 8 channels could dedicated to the Red image component, 8 channels could be dedicated to the Green image component, and 8 channels could be dedicated to the Blue image component). In some embodiments, these additional filter channels (e.g., the aforementioned 24 channels) may be independently determined by the network in order to perform noise reduction in an optimal fashion on the fused image result at each level of the pyramidal representation.

For example, as shown in exemplary noise reduction filter 312D (corresponding to output filters 310D for the V component of the image), the eight filter values output by the network may correspond to eight distinct weights (labeled v1 through v8) in a 3×3 neighborhood surrounding a given fused pixel value (i.e., the value of the fused pixel at the center of the 3×3 neighborhood), which may be used to denoise the given fused pixel, e.g., by calculating a weighted sum (wherein each of the 8 neighboring pixels are assigned a weight value by the network and the fused pixel at the center of the neighborhood is assigned a default weight) to replace the value of the given fused pixel with an optimally denoised value. In some embodiments, a normalized weighting scheme may be used wherein, e.g., the central tap of the filter (e.g., corresponding to the central pixel of the 3×3 neighborhood) receives a weight value of '1.' Next, each of the other filter taps (including the central one) are normalized, such that their sum is equal to '1.' To achieve this, the normalization may be done by dividing each filter tap by the sum of the weights of all of the filter taps.

It is to be understood that larger neighborhoods than 3×3 may be used if desired, and/or the denoising parameters used in a given implementation may take some form other than a weighted sum of the values of neighboring pixels. The form of noise reduction parameters used, however, may affect the number of output filters that the network needs to be trained to produce at each level, which could affect network performance. For example, if a 5×5 neighborhood of denoising weights is needed for each pixel, the number of channels that are needed to be produced by the network at each level may increase from 25 (i.e., 1+8+8+8), as in the example shown in FIG. 3, to 73 (1+24+24+24).

In other embodiments, the denoising operations may alternately be performed using so-called "direct denoising" (DD), i.e., without estimating and applying a set of filters for every pixel, but instead letting the network directly estimate the amount of noise in each pixel, which amount should then be added to (or subtracted from) the pixel value in order to obtain the "noise free" value of the pixel. After the fusion operations are performed, the determined DD values for each channel (e.g., Y, U, V) may simply be added to (or subtracted from) the fusion results for each pixel in order to obtain the denoised version of that pixel level. One benefit of such an approach is that the network would be able to provide only a single value per-channel for each pixel (i.e., the estimated noise amount present in the pixel for the given channel), instead of the 8 (or 24) values otherwise needed when using the 3×3 (or 5×5) neighborhood filtering methods described above. In still other embodiments, it is also possible to use DD for only some levels of the pyramid and then use filtering-based noise reduction methods for the other levels of the pyramid.

Figure 4:
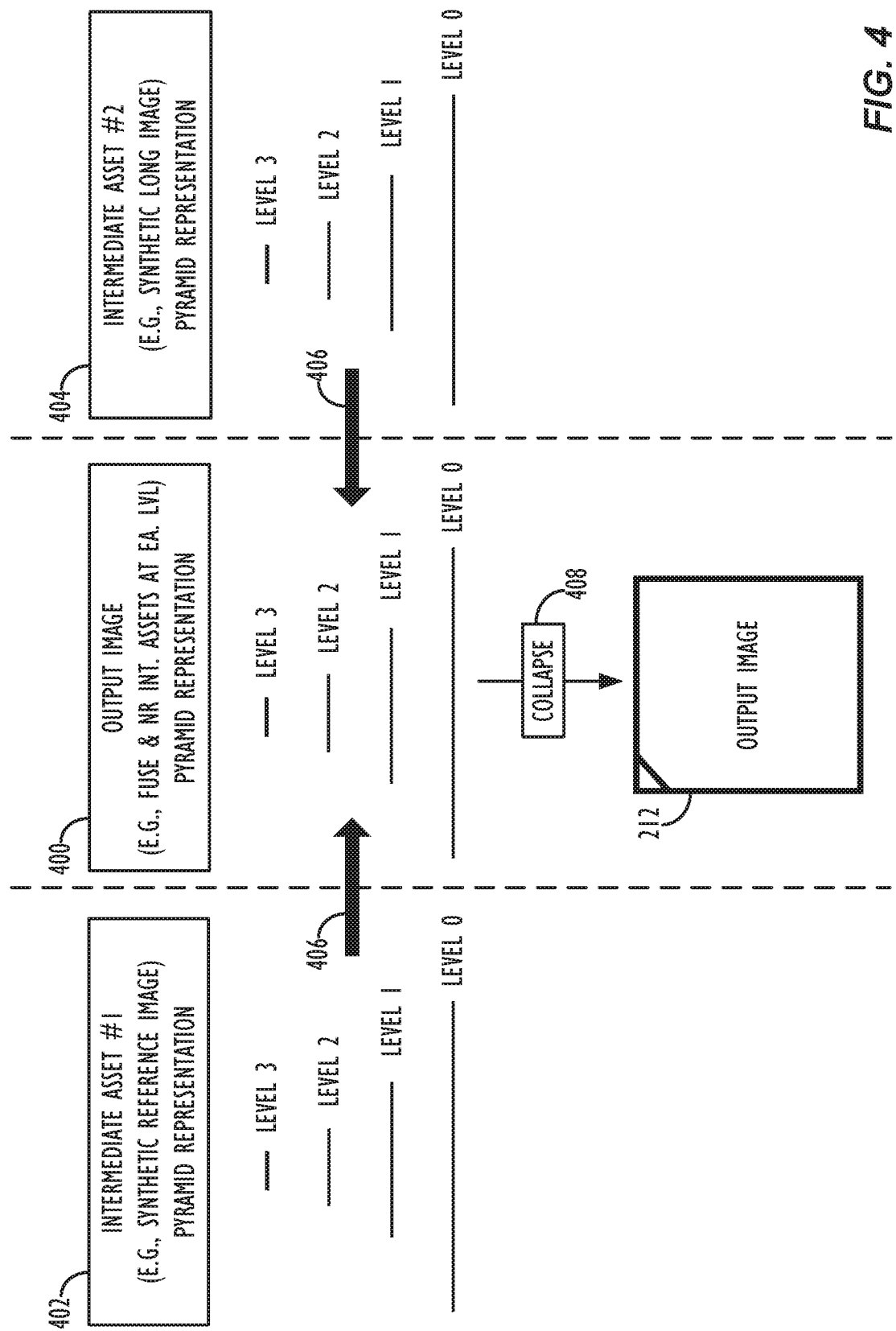
FIG. 4 illustrates exemplary pyramidal decompositions of generated synthetic intermediate assets and a generated output image, which may be used in a process for performing machine learning-enhanced image fusion and/or noise reduction, according to one or more embodiments.

Referring now to FIG. 4, exemplary pyramidal decompositions (400/402/404) of generated synthetic image-based intermediate assets and a generated output image, which may be used in a process for performing machine learning-enhanced image fusion and/or noise reduction, are illustrated, according to one or more embodiments. On the left-hand side of FIG. 4 is a first intermediate asset (Intermediate Asset #1) 402, which may, as discussed above, represented a synthetic reference image that was generated using a determined one or more images from the incoming image stream, and on the right-hand side of FIG. 4 is a second intermediate asset (Intermediate Asset #2) 404, which may, as discussed above, represented a synthetic long image that was generated using another determined one or more images from the incoming image stream.

In some embodiments, the synthetic reference image may be generated such that it has better freezing of motion, better preservation of detail, and/or better dynamic range (but perhaps increased noise levels) as compared to the synthetic long image; and the synthetic long image may be generated such that it has decreased noise, especially in static areas of the captured scene (but perhaps worse motion freezing), as compared to the synthetic reference image. In some embodiments, these dual goals may be simultaneously achieved by generating the synthetic reference image from a first determined combination of two or more images from the incoming image stream that have a shorter aggregate exposure time than a second determined combination of two or more images from the incoming image stream used to generate the synthetic long image. In other embodiments, as mentioned above, similar characteristics may be achieved in the intermediate assets by selecting a single image from the incoming image stream to serve as either the synthetic reference and/or synthetic long image for the final image fusion operation.

Arrows 406 in FIG. 4 indicate that each corresponding level in the pyramidal representations of the first and second intermediate assets (and any other intermediate assets that may be used by a given implementation) are combined (e.g., according to fusion and/or noise reduction parameters determined by a trained neural network) to form the corresponding pyramidal levels in the output image representation 400. As described above with reference to FIG. 3, the pyramidal representations of the image-based input intermediate assets may be independently fused and/or noise-reduced according to the set of output filters (e.g., the 25-channel output filter example 310 in FIG. 3), of the corresponding layer of the network. Once the network output filters have been applied to the intermediate assets at each level of the pyramidal representations and stored in the output image pyramidal representation 400, the levels of the output image pyramidal representation 400 may be collapsed 408 according to known Laplacian image pyramid processing techniques, to generate the output image 212 (which output image 212 may, as described above with reference to FIG. 2, also be subjected to any desired post-processing or tuning operations, based on the needs or desires of a given implementation).

Figure 5:
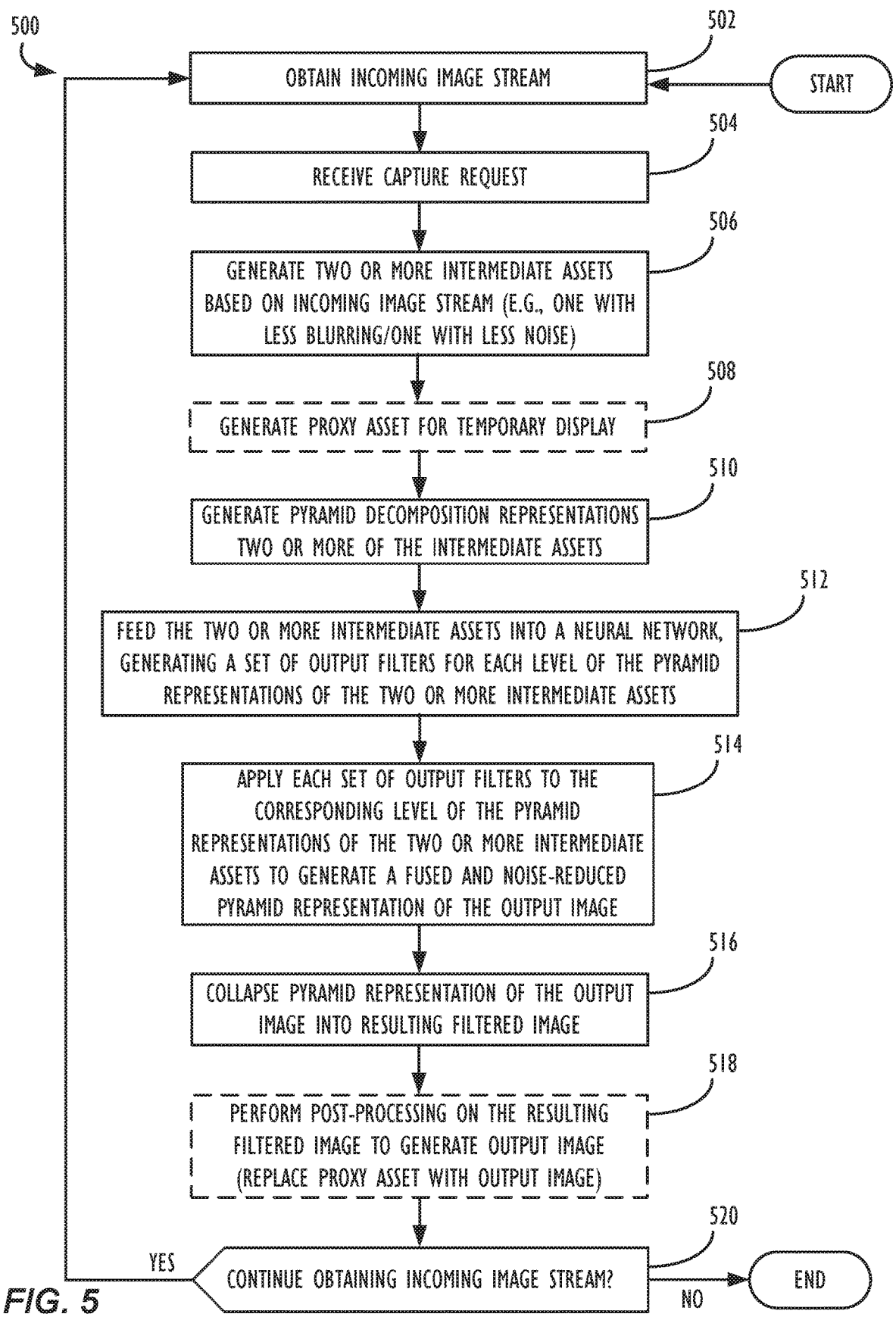
FIG. 5 is flow chart illustrating a method of performing machine learning-enhanced image fusion and/or noise reduction using generated synthetic intermediate assets, according to one or more embodiments.

Referring now to FIG. 5, a flow chart illustrating a method 500 of performing machine learning-enhanced image fusion and/or noise reduction using generated synthetic intermediate assets is shown, according to one or more embodiments. The method 500 may begin at Step 502 by obtaining an incoming image stream (e.g., image stream 100 of FIG. 1A). Next, at Step 504, the method 500 may receive an image capture request (e.g., image capture request 106 of FIG. 1A). In response to the image capture request, at Step 506, the method 500 may generate two or more intermediate assets based on the incoming image stream. As described above, the generated intermediate assets may include image-based and non-image-based intermediate assets. The image-based intermediate assets may be generated using one or more images from the incoming image stream, wherein the images used in a given intermediate asset could come from immediately prior to the capture request, up to an including a threshold number of images captured prior to the capture request (e.g., depending on how many prior captured images an image capture device may be able to continue to hold in memory), and/or one or more images that are captured after receiving the image capture request (e.g., the long exposure image 108 of FIG. 1A). In some embodiments, the one or more images used to form the intermediate assets will be determined such that a first intermediate asset is sharper (i.e., less blurred) than a second intermediate asset, while the second intermediate asset exhibits less noise than the first intermediate asset.

At Step 508, the method 500 may optionally produce a proxy asset, e.g., utilizing one or more of the generated intermediate assets. As described above, such proxy asset may, e.g., be available for temporary display or interaction with by a user of the image capture device, at least during the time period when the deferred neural network-based processing is being performed to generate the final output image. In other embodiments, the proxy asset is not necessarily generated, and the system may, e.g., simply wait until the deferred neural network-based processing has complete before presenting the final output image to a user for display or interaction.

At Step 510, the method 500 may generate pyramidal decomposition representations of two or more of the intermediate assets. As described above with reference to FIGS. 3 and 4, according to some embodiments, the pyramidal compositions may comprise Laplacian pyramids, such that only residual information is stored at each higher frequency level of the pyramid, although other types of pyramidal decomposition representations, e.g., discrete wavelet transformation decompositions, are also possible, as long as any neural network is properly trained on its expected input and configured to produce the appropriate output filters. For example, in embodiments employing a discrete wavelet transformation decomposition, an appropriately trained network may produce an output at each resolution corresponding to each of the filtering directions used (e.g., three outputs at each resolution level, i.e., one corresponding to each of the horizontal, vertical, and diagonal directions).

As Step 512, the method 500 may feed the two or more generated intermediate assets into a trained deep neural network, wherein such network has been configured to generate a set of output filters corresponding to each level of the pyramidal representations of the intermediate assets. According to some embodiments, as described above, each such set of output filters generated by the network may comprise multiple channels, which may be used to de-ghost (i.e., fuse) and denoise the corresponding level of the pyramidal representation of the output image. [In some embodiments, Step 512 may optionally be performed prior to (or concurrently with) Step 510.] At Step 514, the output filters for a given layer of the network may be used on (or applied to) the image data corresponding level of the pyramidal representations of the two or more generated intermediate assets, e.g., thereby generating a fused and/or noise-reduced pyramidal representation of the final fused output image.

Finally, at Step 516, the pyramidal representation of the fused output image may be collapsed back down into a single image that has been appropriated filtered by the neural network (e.g., having been fused and/or noise reduced at each level via the application of the filters produced by the neural network). If desired, at Step 518, optional post-processing and/or tuning may be performed on the filtered image to generate the final fused output image. At that point, if a proxy asset were generated at Step 508, it could be updated or replaced with the final fused output image from Step 518. At Step 520, if the image capture device has been directed, e.g., by a user, to continue obtaining an incoming image stream (i.e., "YES" at Step 520), the method 500 may return to Step 502. If, instead, the image capture device has been directed, e.g., by a user, to stop obtaining an incoming image stream (i.e., "NO" at Step 520), the method 500 may terminate.

Figure 6:
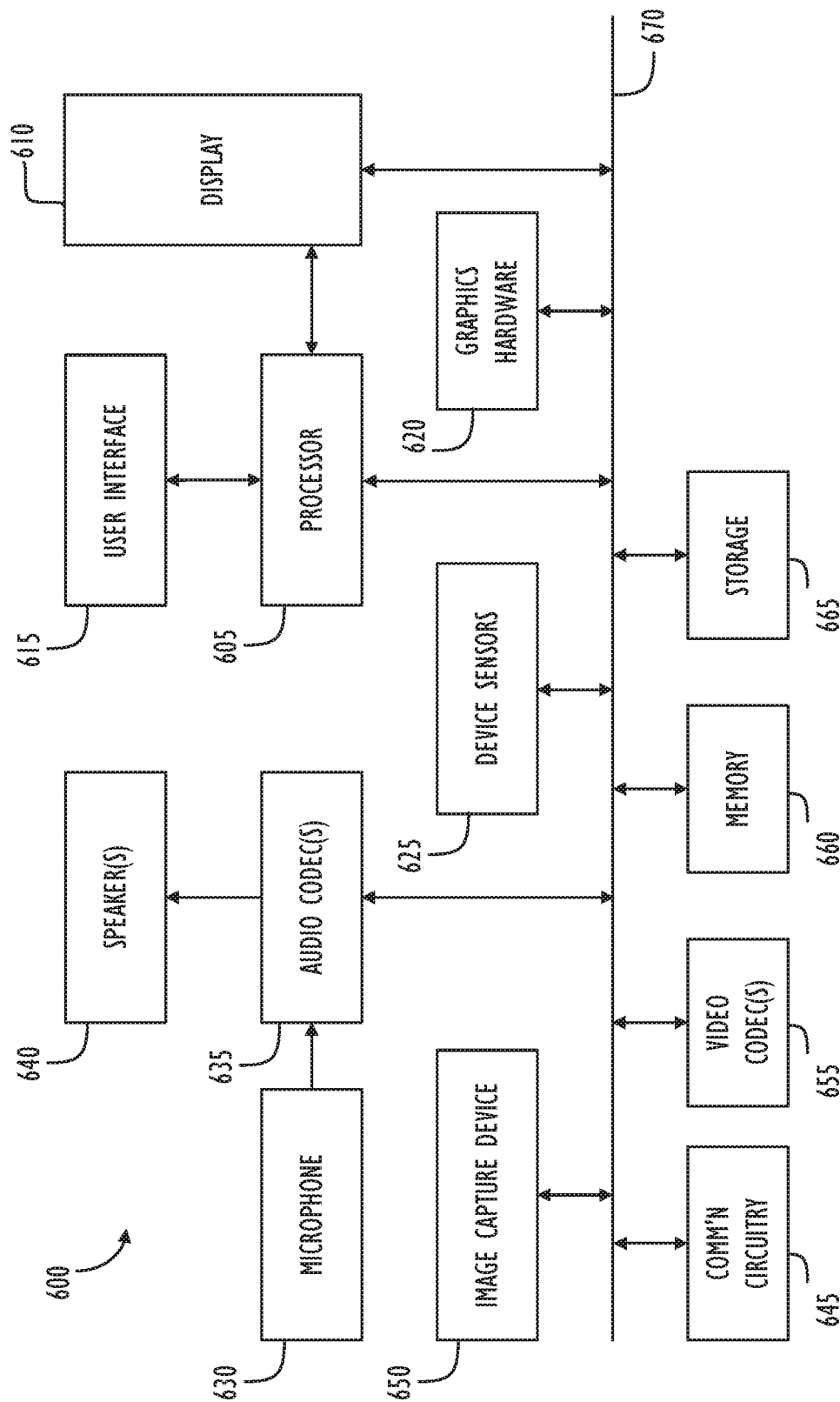
FIG. 6 is a block diagram illustrating a programmable electronic computing device, in which one or more of the techniques disclosed herein may be implemented.

Referring now to FIG. 6, a simplified functional block diagram of illustrative programmable electronic computing device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device 650, which may, e.g., comprise multiple camera units/optical image sensors having different characteristics or abilities (e.g., SIS, HDR, OIS systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more specialized SOCs, e.g., an SOC specially designed to implement neural network and machine learning operations in a more energy-efficient manner than either the main device central processing unit (CPU) or a typical GPU.

Image capture device 650 may comprise one or more camera units configured to capture images, e.g., images which may be processed to generate fused versions of said captured images, e.g., in accordance with this disclosure. Output from image capture device 650 may be processed, at least in part, by video codec(s) 655 and/or processor 605 and/or graphics hardware 620, and/or a dedicated image processing unit or image signal processor incorporated within image capture device 650. Images so captured may be stored in memory 660 and/or storage 665. Memory 660 may include one or more different types of media used by processor 605, graphics hardware 620, and image capture device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a user interface; and
   one or more processors operatively coupled to the memory, wherein the one or more processors are configured to execute instructions causing the one or more processors to:
     obtain an incoming image stream from the one or more image capture devices;
     receive an image capture request via the user interface;
     generate, in response to the image capture request, two or more intermediate assets, wherein:
       a first intermediate asset of the generated two or more intermediate assets comprises an image generated using a determined first one or more images from the incoming image stream, and
       a second intermediate asset of the generated two or more intermediate assets comprises an image generated using a determined second one or more images from the incoming image stream;
     generate a first pyramidal decomposition, having a first plurality of levels, using the first intermediate asset;
     generate a second pyramidal decomposition, having the first plurality of levels, using the second intermediate asset;
     feed the first and second intermediate assets into a neural network, wherein the neural network is configured to produce a set of filters corresponding to each level of the first and second pyramidal decompositions;
     generate an output image pyramidal decomposition having the first plurality of levels, wherein each level of the output image pyramidal decomposition is determined using:
       the corresponding level of the first pyramidal decomposition;
       the corresponding level of the second pyramidal decomposition; and
       the corresponding set of filters produced by the neural network; and
     generate an output image using the output image pyramidal decomposition.

2. The device of claim 1, wherein the determined first one or more images are determined, such that the first intermediate asset is sharper than the second intermediate asset.

3. The device of claim 2, wherein the determined second one or more images are determined, such that the second intermediate asset is less noisy than the first intermediate asset.

4. The device of claim 1, wherein the first, second, and output pyramidal decompositions comprise band-pass multi-scale image decompositions.

5. The device of claim 1, wherein at least one of the filters in the set of filters produced for a given level of the first and second pyramidal decompositions comprises a fusion weight, wherein the fusion weight specifies a relative contribution of the first intermediate asset and the second intermediate asset at the given level of the output image pyramidal decomposition.

6. The device of claim 1, wherein the generated two or more intermediate assets further comprises a third intermediate asset, and wherein the third intermediate asset comprises a noise map that is representative of an amount of noise in the second intermediate asset.

7. The device of claim 6, wherein the one or more processors are further configured to execute instructions causing the one or more processors to:
feed the third intermediate asset into the neural network.

8. The device of claim 7, wherein at least one of the filters in the set of filters produced for a given level of the first and second pyramidal decompositions comprises a noise reduction parameter, wherein the noise reduction parameter is based, at least in part, on the third intermediate asset and specifies, at least in part, an amount of noise reduction to apply to the given level of the output image pyramidal decomposition.

9. The device of claim 8, wherein the noise map comprises a plurality of values, and wherein each value is indicative of a number of images from the incoming image stream contributing to the second intermediate asset at a corresponding pixel location of the second intermediate asset.

10. The device of claim 1, wherein the incoming image stream comprises images with two or more different exposure values.

11. The device of claim 1, wherein the neural network is further configured to produce at least one direct denoising (DD) value that is applied to at least one pixel of at least one level of the output image pyramidal decomposition.

12. The device of claim 10, wherein the determined first one or more images from the incoming image stream comprises: at least one EV0 image and at least one EV− image.

13. The device of claim 10, wherein the determined second one or more images from the incoming image stream comprises: at least two EV0 or EV+ images.

14. The device of claim 1, wherein the one or more processors are further configured to execute instructions causing the one or more processors to:
generate a proxy asset using the first intermediate asset and the second intermediate asset; and
provide the proxy asset for display via the user interface prior to completing the execution of the instructions to generate the output image.

15. The device of claim 1, wherein the neural network comprises a neural network trained to determine fusion weights for fusion of the first intermediate asset and the second intermediate asset.

16. An image processing method, comprising:
obtaining an incoming image stream from one or more image capture devices;
receiving an image capture request;
generating, in response to the image capture request, two or more intermediate assets, wherein:
a first intermediate asset of the generated two or more intermediate assets comprises an image generated using a determined first one or more images from the incoming image stream, and
a second intermediate asset of the generated two or more intermediate assets comprises an image generated using a determined second one or more images from the incoming image stream;
generating a first pyramidal decomposition, having a first plurality of levels, using the first intermediate asset;
generating a second pyramidal decomposition, having the first plurality of levels, using the second intermediate asset;
feeding the first and second intermediate assets into a neural network, wherein the neural network is configured to produce a set of filters corresponding to each level of the first and second pyramidal decompositions;
generating an output image pyramidal decomposition having the first plurality of levels, wherein each level of the output image pyramidal decomposition is determined using:
the corresponding level of the first pyramidal decomposition;
the corresponding level of the second pyramidal decomposition; and
the corresponding set of filters produced by the neural network; and
generating an output image using the output image pyramidal decomposition.

17. The method of claim 16, wherein the determined first one or more images are determined, such that the first intermediate asset is sharper than the second intermediate asset, and wherein the determined second one or more images are determined, such that the second intermediate asset is less noisy than the first intermediate asset.

18. The method of claim 16, wherein at least one of the filters in the set of filters produced for a given level of the first and second pyramidal decompositions comprises a fusion weight, wherein the fusion weight specifies a relative contribution of the first intermediate asset and the second intermediate asset at the given level of the output image pyramidal decomposition.

19. The method of claim 16, wherein at least one of the filters in the set of filters produced for a given level of the first and second pyramidal decompositions comprises a noise reduction parameter, wherein the noise reduction parameter specifies, at least in part, an amount of noise reduction to apply to the given level of the output image pyramidal decomposition.

20. A non-transitory program storage device comprising instructions stored thereon to cause one or more processors to:
obtain an incoming image stream from one or more image capture devices;
receive an image capture request;
generate, in response to the image capture request, two or more intermediate assets, wherein:
a first intermediate asset of the generated two or more intermediate assets comprises an image generated using a determined first one or more images from the incoming image stream, and
a second intermediate asset of the generated two or more intermediate assets comprises an image generated using a determined second one or more images from the incoming image stream;
generate a first pyramidal decomposition, having a first plurality of levels, using the first intermediate asset;
generate a second pyramidal decomposition, having the first plurality of levels, using the second intermediate asset;
feed the first and second intermediate assets into a neural network, wherein the neural network is configured to produce a set of filters corresponding to each level of the first and second pyramidal decompositions;
generate an output image pyramidal decomposition having the first plurality of levels, wherein each level of the output image pyramidal decomposition is determined using:
the corresponding level of the first pyramidal decomposition;

the corresponding level of the second pyramidal decomposition; and the corresponding set of filters produced by the neural network; and generate an output image using the output image pyramidal decomposition.

\* \* \* \* \*